Nov. 17, 1959 D. R. GREENBERG ET AL 2,913,652
SPEED REGULATING SERVO SYSTEM
Filed Dec. 31, 1956
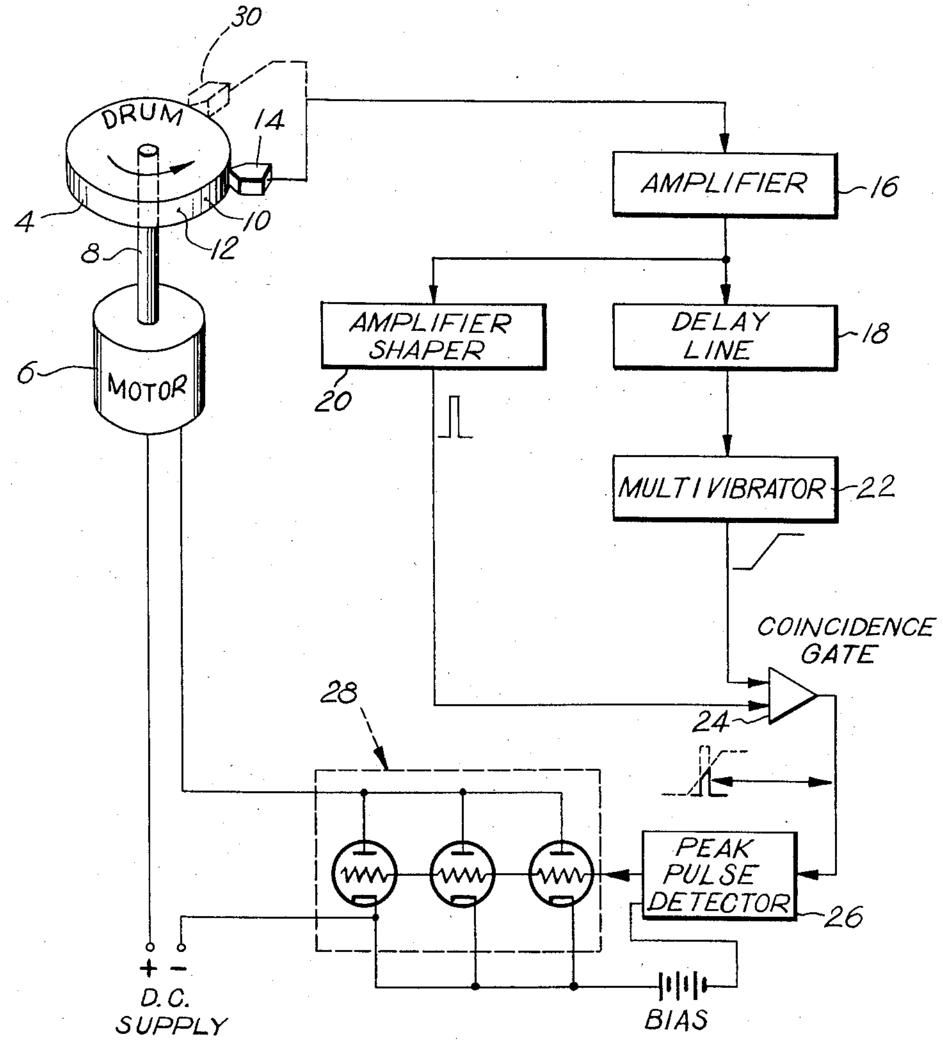
INVENTORS.
DAVID R. GREENBERG
DAVID H. MARCUS
BY Eli Weiss ATTORNEY United States Patent Office 2,913,652

Patented Nov. 17, 1959

2,913,652

SPEED REGULATING SERVO SYSTEM

David R. Greenberg, Bellerose, and David H. Marcus, Syosset, N.Y., assignors, by mesne assignments, to Burroughs Corporation, Detroit, Mich., a corporation of Michigan Application December 31, 1956, Serial No. 632,618

12 Claims. (Cl. 318—309)

This invention relates in general to control devices and more particularly to a speed regulating servo system for driving a rotatable member at a predetermined speed.

Many electronic computers utilize control or programming equipment, and information storage or memory equipment. This equipment can be in the form of a punched tape or an electro-magnetically sensitive drum, disc, tape or belt that is driven at a predetermined rate of speed by an electric motor. For purposes of convenience, however, the punched tape and the magnetic drum, disc, tape and belt will hereinafter be referred to as a magnetic drum, it being understood, however, that the term magnetic drum as hereinafter used can refer to any one of the above mentioned information containing mediums.

The successful operation of electronic computers depends, to a large extent, on the precise timing or rate of advancement of information signals through the computer. The slightest alteration of the timing sequence will result in the malfunctioning of the computer and the generation of spurious results.

An essential component of an electronic computer that is utilized when relatively short time delays are desired is the lumped parameter LC delay line. This type of delay line consists of inductors and capacitors strategically positioned relative to each other to retard the rate of travel of an electrical signal. Presently, many electronic computers utilize both the lumped parameter LC delay lines and a magnetic drum.

Thus, it readily becomes obvious that a slight variation of the delay characteristic of an LC delay line will upset the timing of a computer to produce spurious results unless the speed of the magnetic drum is altered to compensate for said change. The time delay characteristic of a lumped parameter delay line will vary when the delay line is subjected to vibrations, temperature differentials, change in humidity or the like. The magnetic drum motor, however, is driven at a predetermined speed by means of an externally generated synchronizing signal. Thus, the speed of the magnetic drum motor remains substantially constant barring variations in frictional losses or operating characteristics of the externally generated synchronizing signal source that drives the drum motor. Therefore, the variations of the speed of the drum motor and changes of the time delay of the LC delay lines occur at different rates and under different circumstances.

It is a primary object of the invention to provide a drum motor that can vary its speed automatically to correct for changes in the operating charcteristics of associated delay lines to maintain a selected relationship.

It is another object of the invention to provide a magnetic drum motor that maintains a constant speed regardless of load variations.

It is an additional object of the invention to provide a magnetic drum motor that maintains a constant predetermined speed independently of an externally positional timing generator.

It is still another object of the invention to provide an improved speed servo that is economical to produce.

Other objects and many of the attendant advantages of this invention will be readily appreciated as the apparatus becomes better understood by reference to the following detailed description when considered in connection with the accompanying drawing wherein the figure shows a block diagram of the invention including a magnetic drum, a driving motor, and the associated circuitry.

Briefly, a motor drives a magnetic drum that has a channel containing two or more electromagnetically sensed index markings displaced from each other by a fixed distance. A magnetic pick-up head positioned within close proximity to this channel of the drum generates a signal at each instant that an index marking is sensed. Thus, the time spacing between the pair of signals is proportional directly to the rotational speed of the drum and hence, to the motor speed. The first pulse that is sensed generates a signal that is fed to a lumped parameter LC delay line where it is delayed for a predetermined interval of time equal to that time interval between the generation of the first and second signals when the motor is rotating at the desired speed. The delayed signal is then reshaped to a positive step voltage having a relatively long rise time, which is then fed to an input terminal of a coincidence detector. At this time the second index marking is sensed, and generates a signal that is reshaped to a narrow pulse signal which is fed to another input terminal of the coincidence detector.

The two signals that are fed to the coincidence detector produce a single voltage pulse. The amplitude of this signal is equal to the amplitude of the positive step voltage at the time of occurrence of, and of the same width as the delayed narrow pulse signal. A power controller that is sensitive to variations in voltage amplitude utilizes the output signal of the coincidence detector to control the power that is fed to the drum motor.

Referring to the figure, therein is disclosed a magnetic drum 4 that is driven by a direct current motor 6 through an interconnecting shaft 8. A particular channel on the drum 4 contains two or more magnetized areas 10 and 12 that are spaced apart relative to each other a fixed predetermined distance. Each magnetized area will hereinafter be referred to as an index marking. A single magnetic pick-up head 14 is positioned within close proximity to the drum to scan that channel containing the index markings. Thus, the magnetic pick-up head generates a signal at each instant that an index marking is scanned. Since the spacing between the two index markings 10 and 12 is constant, the time duration between the two signals generated by the index markings 10 and 12 will be proportional directly to the speed of the drum, and hence to the speed of the motor.

The signals generated by the magnetic pick-up head 14 are fed to an amplifier 16 where their magnitudes and wave shapes are stabilized. The output signals from the amplifier 16 are then fed simultaneously to an input terminal of a delay line 18 and to an input terminal of an amplifier shaper 20.

The delay line 18 is of the lumped parameter LC type wherein the signal that appears at the output terminal is delayed in time from the signal that is fed to the input terminal by a predetermined interval of time. In this instance the delay is preset to equal the time interval present between the generation of the first signal and the generation of the second signal by the index markings 10 and 12 respectfully when the motor, and therefore the drum is rotating at the desired speed. Thus, the delay line 18 provides a time delay that is equal to that time interval present between adjacent generated signals when the motor is rotating at the selected speed.

The output signal from the delay line 18 is then fed to a shaper or multivibrator 22 wherein it is reshaped into a positive step pulse output signal having a relatively long rise time. The output signal from the multivibrator is then fed to an input terminal of a coincidence gate 24.

The amplifier shaper 20 generates a narrow pulse signal of constant amplitude which is greater than the maximum amplitude of the step pulse signal. The output signal from the amplifier shaper 20 is fed to a second input terminal of the coincidence gate 24.

The coincidence gate 24 passes a signal equal in amplitude to the potential of the positive step pulse signal at the time of the occurrence of the narrow pulse signal. The output signal from the coincidence gate 24 is fed to a peak pulse detector 26 which controlls the power output of the vacuum tubes 28 that controlls the flow of power to the motor 6. The detector 26 is sensitive to variations of input signal amplitudes and reflects these variations at its output terminal.

In the operation of this device it shall be assumed that the driving motor 6 rotates the magnetic drum 4 in a counter clockwise direction. As the index marker 10 is moved past the magnetic pick-up head 14 a signal is generated. This signal is fed through the amplifier 16 to the input terminal of the amplifier shaper 20 to generate a narrow pulse output signal. The output signal of the amplifier 16 is also fed to the delay line 18 where it is delayed a predetermined length of time. Thus, the output signal from the amplifier shaper is the only signal that appears at the input terminals of the gate 24 and therefore, it is blocked. A short time later, the delayed signal from the delay line 18 is fed to the multivibrator 22 where it is reshaped into a positive step pulse signal having a relatively long rise time. At this instant the second index marking 12 is sensed by the magnetic pick-up head 14 and a second signal is generated. This signal is also fed to the delay line 18 and to the amplifier shaper 20 through the amplifier 16. The signal generated by the sensing of the index marking 10 appears at the output terminal of the multivibrator 22 at the same time that the signal generated by the sensing of the index marking 12 appears at the output terminal of the amplifier shaper 20. These two signals arrive at the input terminals of the coincidence gate 24 simultaneously. However, depending upon the speed of the motor, the relatively sharp pulse signal from the amplifier shaper 20 will be displaced in phase relationship relative to the positive step pulse signal from the multivibrator 22 to generate a signal having an amplitude that is proportional to the time displacement of the two signals relative to each other. The output signal of the coincidence gate 24 is fed to the peak pulse detector 26 which utilizes the input signal to regulate the power that is transmitted to the motor by controlling the power output of the vacuum tubes 28.

It should be noted that the speed of the motor will be locked to some particular value of voltage represented by the slope of the upper portion of the output signal of the coincidence gate 24. Thus, the accuracy of the system is a function of the total width of the rising portion of the step voltage, as compared to the time spacing between generated pulses. Therefore, to obtain good regulation the amplifier-shaper output signal should be as narrow as possible, and the step output signal of the multivibrator should be as flat as possible.

Thus, if the circuit is adjusted to drive the motor at the desired speed when the relatively narrow pulse signal occurs half way up the positive step pulse signal, then if the drum is rotating too slowly the narrow pulse signal will occur at the top of the step voltage to produce a voltage that is larger than when the magnetic drum is running at the correct speed, and the motor will then be driven at a higher speed.

If the drum is rotating too rapidly the relatively sharp pulse signal will occur at the bottom of the step voltage to produce a voltage that is smaller than when the drum is rotating at the correct sepeed, and the motor will then be driven at a lower speed.

In the instance where more than two equally spaced index markings are employed, the first and second appearing index markings will form a first pair, the second and third appearing index markings will form a second pair, and so on.

In some instances it may be advisable to utilize one instead of two index markings. In this instance a second magnetic pick-up head 30 is displaced from the pick-up head 14 a distance equal to the distance between the index markings 10 and 12 and positioned to scan the magnetic drum track containing the single index marking. The output terminals of the pick-up head 30 are coupled in parallel with the terminals of the pick-up head 14 and feed the generated signals to the amplifier 16. In this manner, only one index marking is required.

Thus, it becomes obvious that this invention does not require an externally generated reference signal to regulate accurately the speed of the magnetic drum; that the speed of the drum can be regulated accurately by varying the time delay of the delay line; that only a single composite pulse signal is required to correct an error in speed; and that any changes in the delay characteristic of the associate delay lines due to vibration, temperature differentials, or humidity will be experienced by the delay line 18 to readjust automatically the speed of the rotating drum to correct the variation to maintain a preselect relationship between the speed of the magnetic drum and the time delay of the associated delay lines.

Obviously many modifications and variations of the present invention are possible in the light of the above teaching. It is therefore to be understood that within the scope of the appended claims the invention may be practiced otherwise than as specifically described.

What is claimed is:

1. A speed servo comprising a motor, a member driven by said motor, indexing means coupled to said member, sensing means coupled to scan said member to indicate the presence of said indexing means by producing a signal, signal delay means fed by said sensing means to delay the produced signal, a coincidence gate, a first shaper interposed between an input terminal of said coincidence gate and said signal delay means, a second shaper interposed between a second input terminal of said coincidence gate and said sensing means, and means interposed between said coincidence gate and said motor to regulate the speed of the motor relative to the amplitude of the output signals of the coincidence gate.

2. A speed servo comprising a motor, a member driven by said motor, indexing means coupled to said member, sensing means coupled to scan said member to indicate the presence of said indexing means by producing a signal, signal delay means fed by said sensing means to delay the produced signal, a coincidence gate, a multivibrator interposed between an input terminal of said coincidence gate and said signal delay means to generate a positive step pulse signal having a relatively long rise time, a shaper interposed between a second input terminal of said coincidence gate and said sensing means to generate a sharp pulse signal, and means interposed between said coincidence gate and said motor to regulate the speed of the motor relative to the amplitude of the output signals of the coincidence gate.

3. A speed servo comprising a direct current motor, a member driven by said direct current motor, index markings coupled to said member, sensing means coupled to scan said member to indicate the presence of said index markings by producing a signal, a lumped parameter LC delay line fed by said sensing means to delay the produced signal, a coincidence gate, a multivibrator interposed between an input terminal of said coincidence gate and said delay line to generate a positive step pulse signal having a relatively long rise time, a shaper interposed between a second input terminal of said coincidence gate and said sensing means to shape input signals into sharp pulse signals, and means interposed between said coincidence gate and said direct current motor to regulate the speed of the motor relative to the amplitude of the output signals of the coincidence gate.

4. A speed servo comprising a driving means, a member driven by said driving means, a first indexing means coupled to said member, a second indexing means coupled to said member, sensing means positioned to scan said member to indicate the presence of said indexing means by producing a signal, signal delay means fed by said sensing means to delay the produced signal, a coincidence gate, a first shaper interposed between an input terminal of said coincidence gate and said signal delay means, a second shaper interposed between a second input terminal of said coincidence gate and said sensing means, and means interposed between said coincidence gate and said motor to regulate the speed of the motor relative to the output signal characteristics of the coincidence gate.

5. A speed servo comprising a motor, a member driven by said motor, a first indexing means coupled to said member, a second indexing means coupled to said member, sensing means positioned to scan said member to indicate the presence of said indexing means by producing a signal, signal delay means fed by said sensing means to delay the produced signal, a coincidence gate, a multivibrator interposed between an input terminal of said coincidence gate and said signal delay means to reshape an input signal into a positive step pulse signal having a relatively long rise time, a shaper interposed between a second input terminal of said coincidence gate and said sensing means to reshape input signals into sharp pulse signals, and means interposed between said coincidence gate and said motor to regulate the speed of the motor relative to the amplitude of the output signals of the coincidence gate.

6. A speed servo comprising a direct current motor, a member driven by said motor, a first index marking coupled to said member, a second index marking coupled to said member, sensing means coupled to scan said member to indicate the presence of said first and second index markings by producing respectively a first and a second signal, a lumped parameter LC delay line fed by said sensing means to delay the produced signals, a coincidence gate, a multivibrator interposed between an input terminal of said coincidence gate and said delay line to reshape a positive step pulse signal having a relatively long rise time, a shaper interposed between a second input terminal of said coincidence gate and sensing means to generate input signals into sharp pulse signals, and means interposed between said coincidence gate and said direct current motor to regulate the speed of the motor relative to the amplitude of the output signals of the coincidence gate.

7. A speed servo comprising a motor, a member driven by said motor, indexing means coupled to said member, a first sensing means positioned to indicate the presence of said indexing means by producing a signal, a second sensing means displaced from said first sensing means and positioned to indicate the presence of said indexing means by producing a signal, signal delay means fed by said first and second sensing means to delay the first of the produced signals, a coincidence gate, a first shaper interposed between an input terminal of said coincidence gate and said signal delay means, a second shaper interposed between a second input terminal of said coincidence gate and said first and second sensing means, and means interposed between said coincidence gate and said motor to regulate the speed of the motor relative to the output signal characteristics of the coincidence gate.

8. A speed servo comprising a motor, a member driven by said motor, an index marking coupled to said member, a first sensing means positioned to indicate the presence of said index marking by producing a signal, a second sensing means displaced from said first sensing means and positioned to indicate the presence of said index marking by producing a signal, signal delay means fed by said first and second sensing means to delay the first produced signal, a coincidence gate, a multivibrator interposed between an input terminal of said coincidence gate and said signal delay means, a shaper interposed between a second input terminal of said coincidence gate and said first and second sensing means, and means interposed between said coincidence gate and said motor to regulate the speed of the motor relative to the amplitude of the output signals of the coincidence gate.

9. A speed servo comprising a direct current motor, a member driven by said motor, an index marking coupled to said member, a first sensing means positioned to indicate the presence of said index marking by producing a signal, a second sensing means displaced from said first sensing means and coupled to indicate the presence of said index marking by producing a signal, a lumped parameter LC delay line fed by said first and second sensing means to delay the first produced signal, a coincidence gate, a multivibrator interposed between an input terminal of said coincidence gate and said delay line to reshape an input signal into a positive step pulse signal having a relatively long rise time, a shaper interposed between a second input terminal of said coincidence gate and said first and second sensing means to reshape input signals into sharp pulse output signals, and means interposed between said coincidence gate and said direct current motor to regulate the speed of the motor relative to the amplitude of the output signals of the coincidence gate.

10. A speed servo comprising a direct current motor, a magnetic drum driven by said motor, a first index marking coupled to said magnetic drum, a second index marking coupled to said magnetic drum, a magnetic pick-up head coupled to scan said magnetic drum to indicate presence of said index marking by producing a signal, a delay line fed by said magnetic pick-up head to delay the produced signal, a coincidence gate, a multivibrator interposed between an input terminal of said coincidence gate and said delay line to shape an input signal into a positive step pulse signal having a relatively long rise time, a shaper interposed between a second input terminal of said coincidence gate and said magnetic pick-up head to reshape input signals into sharp pulse signals, and means interposed between said coincidence gate and said direct current motor to regulate the speed of the motor relative to the amplitude of the output signals of the coincidence gate.

11. A speed servo comprising a direct current motor, a magnetic drum driven by said direct current motor, an index marking coupled to said magnetic drum, a first magnetic pick-up head coupled to said magnetic drum to indicate the presence of said index marking by producing a signal, a second magnetic pick-up head displaced from said first magnetic pick-up head and coupled to said magnetic drum to indicate the presence of said index marking by producing a signal, a lumped parameter LC delay line fed by said first and second magnetic pick-up heads to delay the produced signals, a coincidence gate, a multivibrator interposed between an input terminal of said coincidence gate and said delay line to reshape an input signal into a positive step pulse signal having a relatively long rise time, a shaper interposed between a second input terminal of said coincidence gate and said first and second magnetic pick-up heads to reshape the input signals into sharp pulse signals, and means interposed between said coincidence gate and said direct current motor to regulate the speed of the motor relative to the amplitude of the output signals of the coincidence gate.

12. A speed servo comprising a motor, a magnetic drum driven by said motor, an index marking coupled to said magnetic drum, a first magnetic pick-up head coupled to said magnetic drum to indicate the presence of said index marking by producing a signal, a second magnetic pick-up head displaced from said first magnetic pick-up head and coupled to said magnetic drum to indicate the presence of said index marking by producing a signal, a lumped parameter LC delay line fed by said first and second magnetic pick-up heads to delay the produced signals, a coincidence gate, a multivibrator interposed between an input terminal of said coincidence gate and said delay line to reshape an input signal into a step pulse signal having a relatively long rise time, a shaper interposed between a second input terminal of said coincidence gate and said first and second magnetic pick-up heads to reshape the input signals into sharp pulse signals, a pulse detector fed by said coincidence gate, and vacuum tubes interposed between said pulse detector and said motor.

References Cited in the file of this patent

UNITED STATES PATENTS

| | | |
|---|---|---|
| 2,516,356 | Tull et al. | July 25, 1950 |
| 2,603,688 | Cole et al. | July 15, 1952 |
| 2,769,949 | Stratton | Nov. 6, 1956 |
| 2,780,668 | Farr et al. | Feb. 5, 1957 |
| 2,797,378 | Johnson | June 25, 1957 |